Nov. 15, 1960 P. W. PIERCE 2,960,592
KNIFE FOR DECAPPING HONEYCOMB
Filed Oct. 12, 1959
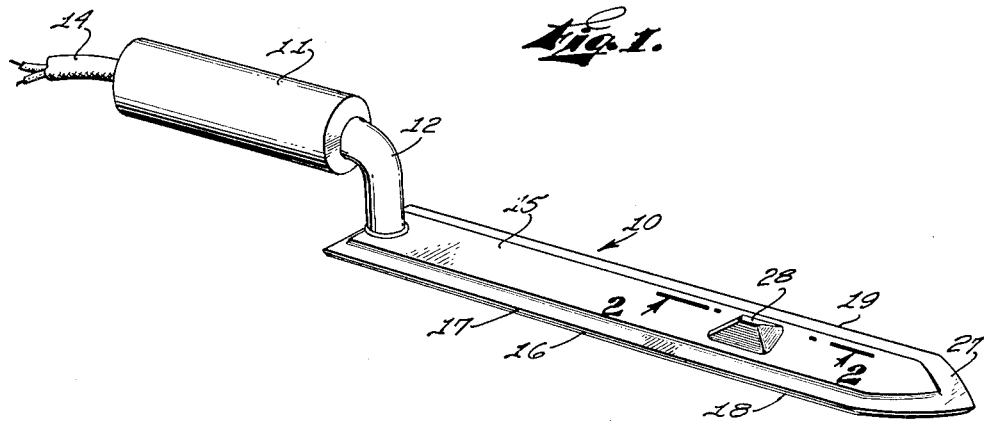
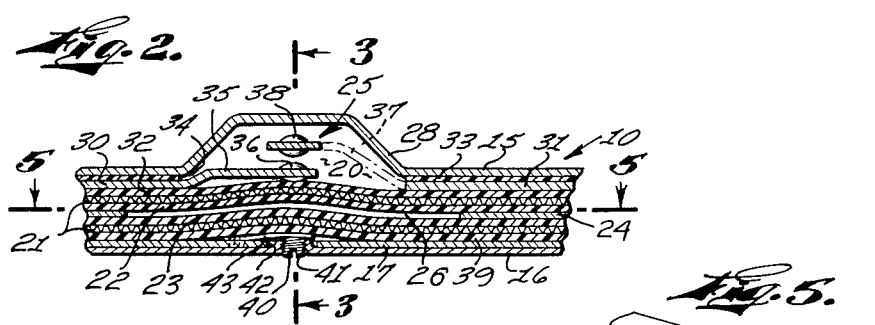
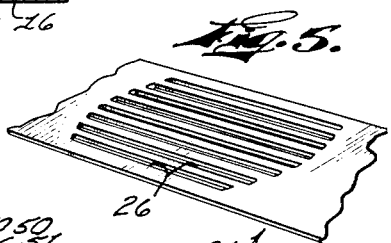
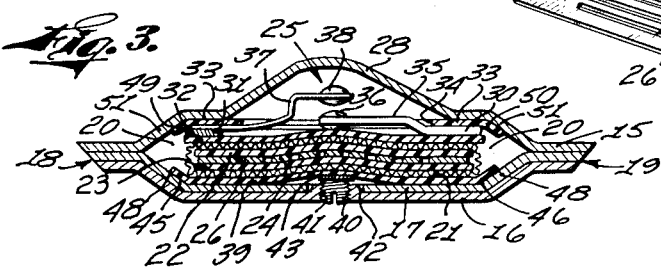
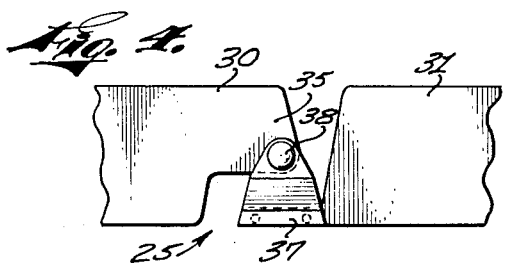
INVENTOR.
PAUL W. PIERCE
BY
Stedman B Hoar
AGENT

United States Patent Office 2,960,592
Patented Nov. 15, 1960

2,960,592

KNIFE FOR DECAPPING HONEYCOMB

Paul W. Pierce, 206 W. Walnut Way, Brea, Calif.

Filed Oct. 12, 1959, Ser. No. 845,937

9 Claims. (Cl. 219—21)

This invention relates to a knife for decapping honeycomb, and more particularly relates to a knife having an improved thermostatic control for an electrical heating element by which the temperature of the knife is regulated.

In the decapping of honeycomb, a hot knife which will cut through the wax of the honeycomb without deforming or mutilating the cells is a practical necessity. Knives for the purpose have been gradually developed from knives heated externally, at first by steam and later by electricity, in order to replace the heat lost in use. In my Patent No. 2,250,602, issued July 29, 1941, I disclosed a knife which was electrically heated. Later developments have included the use of thermostatic controls, by means of which the regulation of the degree of heat has been attempted. However, due to certain peculiar operating conditions with which bee-keepers are familiar, the thermostatic controls hitherto developed have left much to be desired. It may be here emphasized that, far from being able to take any standard thermostatic electric control and apply it to a honey knife, the apiarist is faced with a problem of maintaining temperature within a range of a few degrees, at a position on a knife blade at which the risk of infiltration of honey and consequent short-circuiting is very great. In fact, it may be said that all known attempts hitherto to apply an adjustment for a thermostat directly to a knife blade have failed, and the adjustments have been relegated to positions on the knife handle where they are safe but relatively ineffective.

It is an object of this invention to provide a knife for decapping honeycomb having a thermostat adjustment placed directly upon the knife blade at the point where the flow of honey and wax over the blade is the greatest and where, therefore, the temperature control afforded by the thermostat is most immediate, responsive, and effective.

Another object of my invention is to provide a knife for decapping honeycomb having a hollow blade and a thermostat control on the blade so constructed that leakage of honey through the control to the interior of the blade is prohibited and the usual dangers of short-circuiting are obviated.

A specific object of my invention is to provide a hollow knife blade having within it a heating element and a thermostatic control for the heating element protected by resilient insulating material, and having an adjusting element extending through the side of the knife blade for exerting a pressure on the contents of the blade by means of which the thermostatic control may be adjusted, while at same time the pressure exerted by the blade itself upon the portions of the contents of the blade distant from the adjusting element prevents leakage of fluids into the blade.

In the accompanying drawing, illustrative of a presently preferred embodiment of my invention, Fig. 1 is a perspective view of a honey decapping knife constructed according to my invention;

Fig. 2 is a fragmentary longitudinal sectional view on the line 2—2 of Fig. 1 showing how the heating element, thermostatic control element, insulating material, and adjusting element are positioned to give freedom of adjustive movement within the hollow blade;

Fig. 3 is a transverse sectional view on the line 3—3 of Fig. 2, showing how the foregoing enumerated elements are positioned to provide a fluid-tight seal within the hollow blade;

Fig. 4 is a plan view of the bi-metal thermostatic element as it would be seen looking down in Fig. 2 if the upper knife surface were removed; and Fig. 5 is a perspective view of a metallic heat-conductive strip showing a means for making it especially flexible.

Having reference now to the details of the drawing, a knife blade 10 is provided with a handle 11 offset from the plane of the blade by a gooseneck 12. The handle 11 and gooseneck 12 are hollow, and conduct electric conduits 14 to the knife blade 10. The knife blade 10 is also hollow, to accommodate the hereinafter described heating element, thermostatic element, and fluid-sealing insulating material. The blade 10 preferably has a structure similar to that disclosed in my Patent 2,250,602, having a stainless steel upper blade member 15, and a stainless steel lower blade member 16, and a copper blade member 17 between the members 15 and 16 and lying close to the lower member 16 and following the contours of the latter. The three blade members 15, 16, and 17 are bevelled at the edges to provide bevels 18 and 19 with the member 15 providing the actual cutting edge and the other two members providing a long bevel leading to the cutting edge. The marginal portions of the blade members are joined together, as by welding, and between their marginal portions the members 15 and 17 are offset one from the other to form an interior space 20.

Within the space 20 is a heating element 21, to which the conduits 14 are operatively connected. The heating element 21 is preferably in the form of a coil wound around a dielectric core in the manner familiar to all electricians and needing no particular description. The core comprises two strips 22 and 23 of flexible dielectric material, such as mica, with a shorter strip 24 of metal, preferably copper, between them. The strip 24 is for the purpose of conducting heat away from a thermostatic element 25, to provide a more uniform temperature throughout the knife blade 10. The strip 24 extends only a short distance longitudinally of the blade 10, in the vicinity of the thermostatic element 25, and has less width than the insulating strips 22 and 23 so that it is effectively insulated by them from the heating coil 21. As it is a part of my invention that the entire contents of the blade 10 shall have enough flexibility to move under pressure away from the copper blade member 17 towards the steel blade member 15, and back again resiliently, the copper strip 24 is scored as shown at 26 in Fig. 5, to increase its flexibility.

The exact position of the thermostatic element 25 is not essential although I prefer to place it about two-thirds of the way from the goose-neck 12 to the point 27 of the knife, as this is central in the forward two-thirds of the blade 10 which generally receive the most use. On the exterior of the member 15, directly above the thermostatic element 25 is a small dome 28 which affords the space necessary for movement of the thermostat parts.

The thermostat element 25 is in series in the circuit which includes the conduits 14 and the heating coil 21. At the heel of the knife blade 10 one end of the heating coil 21 is secured to one of the conduits 14, and a conducting plate 30 is connected to the other conduit 14. At the point end 27 of the knife, the other end of the heating coil 21 is connected to a second conducting plate 31. The plates 30 and 31 lie in the same plane and are insulated from the heating coil 21 by a strip of mica 32, around the ends of which they are folded to make contact with the respective ends of the coil 21. Between the plates 30 and 31 and the blade member 15 is another strip of mica 33 to insulate the conducting elements from the blade. The mica strip 33 has in it an opening 34 which lies directly below the dome 28. The free end 35 of the plate 30 inclines upward through the opening 34 and terminates in a contact button 36. Likewise the free end of the plate 31 inclines upward through the opening 34 at a greater angle of inclination and terminates in a contact button 38 directly above the button 36. The free end of the plate 31 is a bi-metal element 37 which completes the thermostat 25 and which tends to curl upward when heated to move the associated button 38 further upward into the free space of the dome 28, away from the button 35 underlying it.

Underlying the heating coil 21 is another strip of mica 39, for insulating the heating coil from the blade member 17. It is to be understood that the insulating strips 22, 23, 32, 33, and 39 need not be of mica but may be of any dielectric material having sufficient elasticity and resiliency so that the thin strips may be bent by pressure and will return to their original flat shape.

Directly opposite the dome 28, the steel blade member 16 is perforated by a threaded hole 41 in which is disposed a set-screw 40. The copper blade member 17 has a hole 42 through which the set-screw 40 may extend. The hole 42 is overlaid by a thin piece of spring metal 43, secured as by welding at one end to the inner side of the blade member 17. By adjustment of the set-screw 40, the metal strip 43 may be pressed against the mica strip 39, causing the strip 39 to bend, and thus successively the overlying heating coil 21, mica strip 23, copper strip 24, mica strip 22, the upper side of the coil 21, mica strip 32, and finally the conductor arm 35 may be pressed upward to close the gap between the thermostat buttons 36 and 38. By release of the pressure of the set screw 40, the resiliency of these enumerated elements causes them to resume their naturally flat shape and to permit the button 36 to move away from the button 38. Thus the thermostat is adjustable by the set-screw 40, to govern the temperature at which the heating coil 21 turns on and off, although the set-screw is at the opposite side of the blade 10 from the thermostat and is separated from the thermostat by the mass of the various strips and coils enumerated.

It has been proven many times that hot honey will seep through very small openings, and for that reason the usual place for an adjustable thermostat on a honey decapping knife has been, as hereinbefore stated, at the handle of the knife where it could control only the widest swings of temperature. As it has also been proven that a little overheated or burnt honey will spoil the flavor of a large batch in which it is incorporated, and that an unnecessarily cold knife will greatly slow down decapping operations, it will be clear that placement of both the thermostat and its adjustment in the knife blade itself is a much to-be-desired improvement. But only by filling the blade with resilient dielectric strips so disposed that the strips stop all leakage from the set-screw side of the blade to the dome side, has this improvement become possible.

It will be seen from Fig. 3 that the margins 45 and 46 of the resilient strip 39 are compressed by the sloping shoulders 48 of the blade member 17, and that likewise the margins 49 and 50 of the resilient strip 33 are compressed by the sloping shoulders 51 of the blade member 15, the double shoulders 48 and 51 thus holding the margins of the entire mass containing the heating coil 21 under fluid-tight compression, while nevertheless the center of the mass is free to move. The seal so provided is so effective that I have, on occasion, been able to remove the set-screw 40 from the threaded hole 41, permitting hot honey to flow under the strip 39, yet the honey has not penetrated past the compressed margins 45 and 46.

The pressure so maintained on the resilient insulation also enables me to maintain the exact position of all the insulation strips, heating coils, thermostat elements, heat-distributing strips, relative to each other and relative to the knife blade elements, without having to have recourse to welding or other methods of fastening. This of course constitutes a great saving in the costs of manufacture.

The disclosed embodiment is intended to be descriptive only, it being understood that the invention includes any constructive modification falling within the scope and spirit of the appended claims.

I claim:

1. In a honey decapping knife, in combination, a plurality of blade members having marginal portions joined in liquid-tight engagement to form a single blade, outer ones of said blade members being bowed outwardly between said marginal portions to provide an interior space in said single blade, an electric heating coil within said space, strips of resilient insulating material between said coil and said blade members and in marginal contact with said blade members and compressed by said blade members in fluid-tight engagement with each other and with said blade members, a hollow dome on one side of said blade, that strip of insulating material adjacent said one side of said blade having an opening beneath said dome, a thermostatic element on one end of said heating coil extending into said dome, a contact point in series with said heating coil underlying said thermostatic element, and a screw extending through the other side of said blade for pressing said insulating strips towards said dome and thereby pressing said contact point into operational contact with said thermostatic element.

2. In a honey decapping knife, in combination, a hollow blade having stiff blade-forming members joined at their margins to form a flattened elongated enclosure which is fluid-tight except for the hereinafter mentioned threaded hole and handle, a dome on one side of said blade, a threaded hole on the other side of said blade and opposite said dome, an electric heating coil within said enclosure, a hollow handle at one end of said blade offset from said blade, electric circuit means in said handle connected to said heating coil, a thermostatic element on said heating coil for opening and closing a circuit through said coil, said element being adjacent said dome, a flexible resilient dielectric covering for said heating coil, said covering being held compressed marginally by said blade-forming members and forming a fluid-tight seal therewith, and a screw in said threaded hole adjustable therein for bending the mass of said dielectric covering, said heating coil, and a portion of said thermostatic element towards and away from said dome.

3. In combination with a hollow knife blade, an electric heating element within said knife blade, a dome on one side of said knife blade, a thermostat in circuit with said heating element and having a temperature-warped arm and a bendable arm, said temperature-warped arm being so positioned as to move into said dome when heated so as then to break contact with said bendable arm and to open said circuit, resilient insulating material surrounding said heating element and said thermostat, said material having an opening opposed to said dome through which said thermostat arms may extend when warped or bent, said material being compressed marginally by the sides of said knife blade so as to form a fluid proof shield for the side of said heating element away from said opening, and a screw in that side of said knife away from said opening, said screw being adjustable to govern the bending of said insulating material, said heating element and said bendable arm towards and away from said dome.

4. In combination with a hollow knife blade providing excess interior space for holding the hereinafter recited elements, an electric heating element within said space, resilient insulating material between said heating element and the sides of said blade and compressed marginally by said blade so as to prevent the passage of fluid from said interior space at one side of said heating element to the interior space at the opposite side of said heating element, a screw in one side of said blade adjustable for pressing the intervening resilient insulating material and heating element toward the opposite side of said blade, and a thermostat in operational circuit with said heating element on the side of said heating element opposite to said screw, said thermostat having an element movable in response to movement of said screw and the intervening elements.

5. The combination recited in claim 4 in which said insulating material has an opening through which said thermostat can move towards the adjacent side of said knife.

6. The combination recited in claim 4 in which said thermostat is held posited in relation to said knife blade by the pressure of said knife blade acting through said insulating material.

7. The combination recited in claim 4 in which said heating element is a coil and includes a resilient core of insulating material around which said coil is wound, said core having an interior strip of metal in the vicinity of said thermostat for carrying heat to and away from said thermostat.

8. The combination recited in claim 7 in which said strip of metal is scored to increase its flexibility.

9. In combination with a hollow knife blade: an electric heating coil and a thermostatic element operatively connected with said heating coil disposed within said knife blade, said thermostatic element being adjustable by movement of its parts, resilient insulating means for insulating said heating coil from the sides and edges of said knife blade and compressed marginally by said knife blade to effect a fluid-tight seal at the margins of said insulating means while being free to move centrally in response to pressure, and means for exerting pressure through central portions of said insulating means for causing adjustive movement of parts of said thermostatic element.

References Cited in the file of this patent

UNITED STATES PATENTS

| | | |
|---|---|---|
| 2,016,523 | Stringer | Oct. 8, 1935 |
| 2,159,869 | Thomas et al. | May 23, 1939 |
| 2,250,602 | Pierce | July 29, 1941 |